(12) United States Patent
Yadgar et al.

(10) Patent No.: US 9,082,402 B2
(45) Date of Patent: Jul. 14, 2015

(54) GENERIC VIRTUAL PERSONAL ASSISTANT PLATFORM

(75) Inventors: Osher Yadgar, Cupertino, CA (US); Neil Yorke-Smith, Cary, NC (US); Bart Peintner, Palo Alto, CA (US); Gokhan Tur, Fremont, CA (US); Necip Fazil Ayan, Sunnyvale, CA (US); Michael J. Wolverton, Mountain View, CA (US); Girish Acharya, Redwood City, CA (US); Venkatarama Satyanarayana Parimi, Fremont, CA (US); William S. Mark, San Mateo, CA (US); Wen Wang, Fremont, CA (US); Andreas Kathol, El Cerrito, CA (US); Regis Vincent, San Mateo, CA (US); Horacio E. Franco, Menlo Park, CA (US)

(73) Assignee: SRI International, Menlo Park, CA (US)

( * ) Notice: Subject to any disclaimer, the term of this patent is extended or adjusted under 35 U.S.C. 154(b) by 713 days.

(21) Appl. No.: 13/314,965

(22) Filed: Dec. 8, 2011

(65) Prior Publication Data
US 2013/0152092 A1    Jun. 13, 2013

(51) Int. Cl.
*G10L 15/18* (2013.01)
*G10L 15/19* (2013.01)

(52) U.S. Cl.
CPC ............. *G10L 15/1822* (2013.01); *G10L 15/19* (2013.01)

(58) Field of Classification Search
USPC ........................................ 704/9, 257
See application file for complete search history.

(56) References Cited

U.S. PATENT DOCUMENTS

| | | | |
|---|---|---|---|
| 6,311,159 B1 * | 10/2001 | Van Tichelen et al. | 704/275 |
| 6,513,010 B1 * | 1/2003 | Lewin et al. | 704/270.1 |
| 8,978,007 B2 * | 3/2015 | Hoban et al. | 717/114 |
| 2005/0039165 A1 * | 2/2005 | Wolff et al. | 717/114 |
| 2010/0138215 A1 * | 6/2010 | Williams | 704/9 |

* cited by examiner

*Primary Examiner* — Abul Azad
(74) *Attorney, Agent, or Firm* — Barnes & Thornburg LLP

(57) ABSTRACT

A method for assisting a user with one or more desired tasks is disclosed. For example, an executable, generic language understanding module and an executable, generic task reasoning module are provided for execution in the computer processing system. A set of run-time specifications is provided to the generic language understanding module and the generic task reasoning module, comprising one or more models specific to a domain. A language input is then received from a user, an intention of the user is determined with respect to one or more desired tasks, and the user is assisted with the one or more desired tasks, in accordance with the intention of the user.

28 Claims, 5 Drawing Sheets

GENERIC VIRTUAL PERSONAL ASSISTANT PLATFORM

FIELD OF THE DISCLOSURE

The present disclosure relates generally to dialog-driven interactive applications, and relates more particularly to methods and apparatuses for natural language interaction in dialog-driven interactive applications.

BACKGROUND OF THE DISCLOSURE

Various interactive applications allow a user to speak or enter text, sometimes including natural language, and have a dialog with a computational entity. For example, an airline information system may comprise a natural language interactive voice response (IVR) system which interacts with a customer by providing a series of choices for the customer (e.g., by a recorded voice). The customer may select from among various options by speaking a natural language response. For example, a customer may request flight status information, reward mileage balance information and upgrade status information. Additional options may be presented to the customer in response to a selection of a prior option. For example, if a customer requests flight status information in response to an initial prerecorded greeting from the IVR system, another prerecorded announcement may prompt the user to state the flight number, date, departure and destination cities, or other pertinent information. In general, such interactive voice response systems are designed and built with significant investment of time and money. In addition, the design of such systems often require specialized knowledge of computer programming and network design in addition to knowledge of specific subject matter in which the system is deployed (e.g., in-depth knowledge of airline services).

SUMMARY OF THE DISCLOSURE

The present disclosure relates to methods, computer-readable media and apparatuses, for assisting a user with one or more desired tasks within a domain. In one embodiment a method comprises providing an executable, generic language understanding module and an executable, generic task reasoning module for execution in a computer processing system. In one embodiment, a set of run-time specifications is provided to the generic language understanding module and the generic task reasoning module, comprising one or more models specific to the domain. A language input is then received from a user and an intention of the user is determined with respect to the one or more desired tasks from the language input. In one embodiment, the intention of the user is determined by the generic language understanding module utilizing the models specific to the domain. The method next assists the user with the one or more desired tasks, in accordance with the intention of the user. In one embodiment, the user is assisted with the one or more desired tasks by the generic task reasoning module, utilizing the models specific to the domain.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
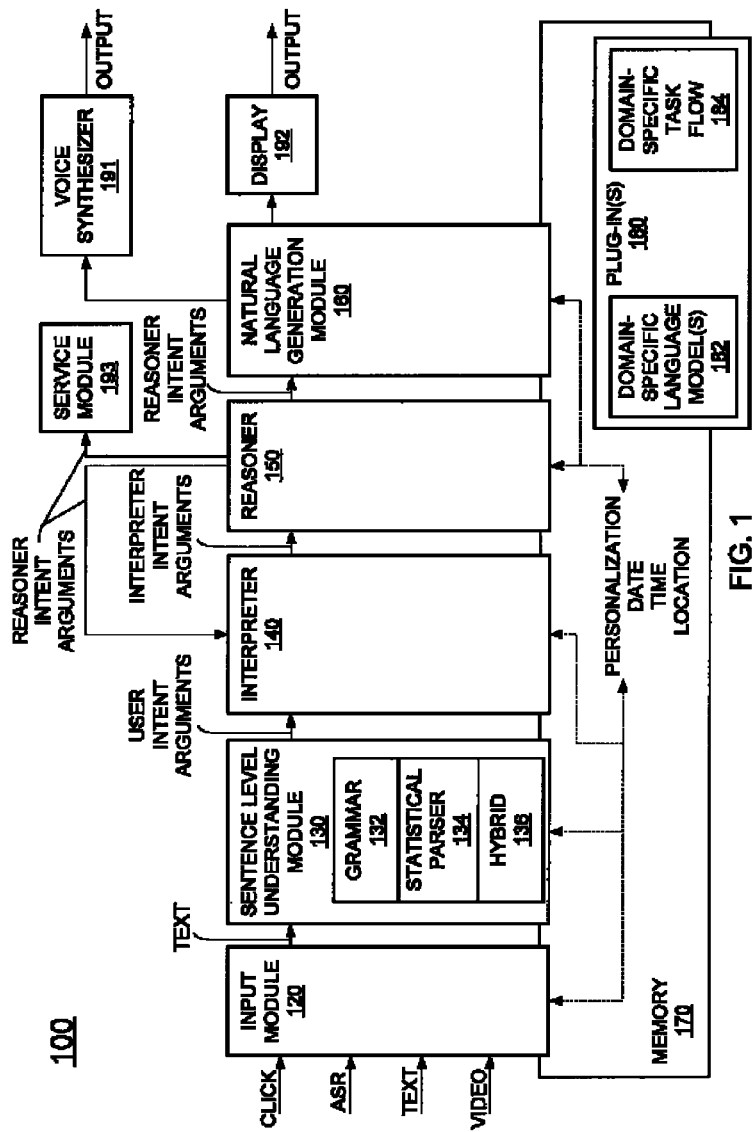
FIG. 1 illustrates an exemplary virtual personal assistant system according to one embodiment of the present disclosure.

The present disclosure relates to a virtual assistant tool for supporting various dialog based applications (e.g., where a user can speak or enter natural language text and have a dialog with a computational entity). In particular, embodiments of the present disclosure relate to devices, systems and software that advance artificial intelligence and speech recognition technology to support fast and efficient development of virtual personal assistants that understand a user's spoken and/or written input, perform tasks, and adapt to user preferences over time. In one embodiment, the present disclosure relates to a domain-independent, or generic virtual personal assistant platform that can be customized using plug-in domain-dependent components. By separating a generic platform from domain-specific characteristics, a standard infrastructure is provided which can be used to rapidly build and deploy virtual personal assistants for different domains, and allow the developers in each domain to focus only on the high-level requirements for their particular domain of interest. A generic virtual personal assistant platform according to the present disclosure supports dialog-based interactions allowing a user to communicate using a language input (e.g., natural language), either in speech or text, as well as gestures, video, webpage interaction, image input, and other forms of input. The platform recognizes the language input and interprets the language input to determine an intent, perform tasks, and provide replies (e.g., in natural language).

In one embodiment, the present disclosure provides a generic virtual personal assistant engine or platform, which is domain independent. A domain may comprise a particular application or task for which the generic virtual personal assistant platform is deployed and/or invoked. For example, one domain may comprise a telephone banking application. Another domain may comprise an online shopping system for a customer to interact with a merchant and order products. In traditional, existing dialog-based applications, the software components which support natural language understanding and reasoning are typically revised or re-written in order to handle the necessities of the domain of interest (e.g., nomenclature, scenarios, business logic, etc.) on a case-by-case basis. For instance, particular necessities of a given domain (e.g., banking, merchandise sales, transportation information, ticket purchase, etc.) may be reflected in the system at many phases of the design. In contrast, embodiments of the present disclosure implement an architectural separation between a domain independent (generic) virtual personal assistant platform and domain-specific models, or plug-in components: e.g., a domain-specific task flow model and one or more domain-specific "language models." The generic personal virtual assistant platform is "generic" insofar as it may potentially be used in a wide variety of domains, when provided with corresponding domain-specific models as input, without the necessity of revising or rewriting source code of the generic platform.

Among other advantages, embodiments of the present disclosure allow separation between a business expert who is responsible for defining and describing the relevant business flows in his domain, and the underlying software code that will execute in accordance with the business flows. Thus, a business flow expert need not be a programmer to define the flow of events that will be supported in a particular dialog or domain. In one embodiment, one or more models specific to a domain may be generated via a computer-assisted development tool to convert a graphical representation of a task flow into a set of run-time specifications.

The business expert, or other system developers, may also define language models for the domain of interest, such as a domain-specific grammar and/or a domain-specific ontology. For example, such language models may include definitions associating names of objects with human-understandable descriptions of what the names mean; classes, relations, functions and the like regarding such objects; and formal axioms that constrain the interpretation of such terms. Additional domain-specific input models may include API's or specifications for calls to services such as external websites, databases and legacy systems, etc. In any case, the language models, as well as the task flow models and any other domain-specific input models, preferably take the form of a set of run-time specifications that can be loaded and executed by one or more processors executing components of a generic virtual personal assistant engine. The run-time specifications may then used by the generic virtual personal assistant to provide interactive assistance and perform various tasks in the corresponding domain of interest. In the present disclosure, such domain-specific components (e.g., a domain-specific task flow and language models for use by the generic virtual personal assistant platform) may individually or collectively be referred to as domain-specific plug-ins, run-time specification(s) or model(s).

In one embodiment, the core of a generic virtual personal assistant platform includes interpretation and reasoning components, such as a sentence-level understanding module, a context-level interpreter and a task reasoner, that comprise the "brains" of the platform for interaction and decision making. There may also be preliminary input processing tools, such as a speech recognition engine or character recognition engine that take voice or writing (respectively) as an input and provide text as output. Some embodiments may also receive and process additional contextual input, such as location data (e.g. GPS), various user characteristics (e.g. tone of voice, facial expression etc.), and/or human supervisory input, for example as described in co-pending, commonly assigned international applications PCT/US2010/047588, titled METHOD AND APPARATUS FOR TAILORING THE OUTPUT OF AN INTELLIGENT AUTOMATED ASSISTANT TO A USER, filed Sep. 1, 2010, and PCT/US2010/047584, titled METHOD AND APPARATUS FOR EXPLOITING HUMAN FEEDBACK IN AN INTELLIGENT AUTOMATED ASSISTANT, filed Sep. 1, 2010, the respective contents of which are herein incorporated by reference in their entireties. The reasoning components, as specialized for the domain of interest by the plug-in(s), take the text input and any other contextual input, and execute a task flow to generate an output, which may include natural language, automated task performance, or any other type of output result. By providing an architectural separation between the core logic of the generic platform and the domain-specific plug-ins, a domain-capable system can more quickly be implemented—in many cases with little or no programmer-level involvement in creating the domain-specific models and no need to rewrite the core generic platform software—so as to support the desired domain-specific flow(s) and connect to any back end systems that are necessary to support the flow(s).

Embodiments of the present disclosure thus provide a reusable or generic virtual personal assistant platform, that can be rapidly configured and reconfigured for multiple applications for content searching, content retrieval and/or transaction completion, among other applications, including: remote banking, electronic shopping/retail applications, customer service applications, transportation information applications, travel planning, medical consultation, military support applications, desktop assistance for assisting a user in completing a workflow on a computing device, assisting the user in a collaborative workflow including the user and another individual (such as an interactive virtual workspace collaboration, and the like), information discovery, rating of articles, desktop and web search, document management, team collaboration, and numerous other tasks.

FIG. 1 is a schematic diagram illustrating one embodiment of a virtual personal assistant system 100, according to the present disclosure. In one embodiment, the virtual personal assistant system 100 includes a generic virtual personal assistant platform 110 that is comprised of a series of modules 120, 130, 140, 150 and 160 and a memory 170 that are collectively configured to provide an assistant platform. In one embodiment, each of the modules 120, 130, 140, 150 and 160 may comprise a hardware processor or a series of hardware processors configured to perform various tasks related to providing an assistant platform. Each of the processors may execute instructions stored in a memory (within the module itself or in memory 170) for performing the described functions. In one embodiment, the virtual personal assistant system is executed in a computer processing system, such as the system 300 in FIG. 3 and/or the general purpose computer 500 in FIG. 5 specially programmed to perform functions of the virtual personal assistant system. In one embodiment, the virtual personal assistant system 100 may be configured using the additional plug-in(s) 180 (e.g., run-time specifications as one or more domain-specific models), which may include the components of a domain-specific plug-in language model 182 and a domain-specific plug-in task flow 184. The interrelations between the plug-in language model 182, the plug-in task flow 184 and the generic virtual personal assistant platform 110 are explained in further detail below. Although only one example of a virtual personal assistant system 100 is provided in FIG. 1, it should be understood that other, further, and different embodiments may be implemented remotely "in the cloud," such as on a server connected to the Internet, a wide area network (WAN), a local area network (LAN), in an enterprise network, and the like. As illustrated, the main components of the virtual personal assistant system 100 are a generic virtual personal assistant platform 110 and plug-in 180 (e.g., domain-specific components).

As illustrated, in one embodiment, the generic virtual personal assistant platform 110 includes an input module 120 that is configured to take any number of different kinds of inputs, e.g., a language input or a natural language input in the form of speech or text, a video capturing gestures made by a user, a click on a region of a display (e.g., a click on an online form), and the like, and then to convert the input to text. In one embodiment, the input module 120 may comprise a speech recognition engine, or speech recognition module having a speech recognition engine/tool such as those available from NUANCE COMMUNICATIONS, INC., DYNASPEAK, the SRI Language Modeling Toolkit (SRILM), or other available speech recognition technologies. In one embodiment, the speech recognition module may receive audio/speech signals input via a microphone attached to a computing device (e.g., where the generic virtual personal assistant platform is implemented in a laptop, a personal computer, mobile device, or the like), via network sources (such as where the generic virtual personal assistant platform is implemented in a networked server attached to a local area network, a wide area network, the internet, and the like), or via other external sources (such as a USB drive, CD-ROM, floppy disk, etc.). The input audio/speech signals may comprise analog voice/speech/audio data, in which case the speech recognition tool may include an analog to digital converter. In any event, the speech recognition may output text data representative of the input audio/speech data. In some embodiments, an input may comprise a multimedia input having a video portion and an audio portion, in which case, the multimedia input may be parsed to extract the audio portion from which speech/language can be recognized by a speech recognition tool included in the input module. In other embodiments, gestures may be recognized in the video portion (e.g., standard gestures such as American Sign Language input, or domain specific gestures, e.g., trading floor gestures, such as for commodities trading, and the like). It should also be noted that in additional embodiments, the input may comprise automatic speech recognition (ASR) input. For example, an external device may previously have performed automatic speech recognition, passing the results as an input to the input module 120.

The generic virtual personal assistant platform 110 also includes a sentence-level understanding module 130 which receives text data (e.g., in the form of a text data file or a stream of text data) from input module 120, and analyzes the text using a number of tools. It should be noted that although the module 130 has been labeled as a sentence-level understanding module, the functionality is not limited to simply understanding full or complete sentence. Rather, the sentence-level understanding module 130 is configured to derive an understanding of fragments or other portions of sentences, incomplete sentences, and more generally, whatever utterance is input by the user in the current round of the dialog, regardless of whether or not it strictly comprises a "sentence."

In one embodiment, the sentence-level understanding module 130 may implement a natural language understanding module that includes such technology as the GEMINI Natural Language Understanding System. In one embodiment, the sentence-level understanding module 130 may include components such as a rule-based grammar module 132 and a statistical parser module 134. In one embodiment, a hybrid parsing approach may be used—represented by module 136—in which a statistical module 134 is invoked if rule-based grammar module 132 fails to confidently parse the input. In some embodiments, the sentence-level understanding module 130 may further include other components such as a lexicon and syntactical rules.

In various embodiments of the present disclosure, the sentence-level understanding module 130 may also be configured to receive a domain-specific plug-in, such as domain-specific language model 182. For example, the domain-specific language model 182 may include grammar rules and semantic information (such as proper nouns, people's names, place names, email addresses, phrases, telephone numbers, dates, times, addresses, and the like) which are specific to the particular domain. In one embodiment, the domain-specific language model 182 may comprise an ontology.

The sentence-level understanding module 130 outputs the results of an analysis on the input text, which is representative of the user's intent as ascertained so far. In one embodiment, the output, or "user intent arguments," of sentence-level understanding module 130 may comprise annotated text. For example, in order to keep track of phrase boundaries in the input text, the sentence-level understanding module 130 may store information in the form of text annotations or metadata along with the text. This representation (i.e., the "user intent arguments") is then passed to the interpreter 140.

It should be noted that in some embodiments, input module 120 and sentence-level understanding module 130 may, in fact, be integrated within a single module that provides the functionalities of both the input module 120 and sentence-level understanding module 130 described above.

Interpreter 140 is configured to determine the intent of the user in the particular application for which the virtual personal assistant system 100 has been deployed and in the current context of an on-going interactive dialog. For example, if the generic virtual personal assistant 110 has been configured for an online banking application though online banking plug-ins (e.g., plug-ins 180), the interpreter may apply the intent of the user to the domain-specific task flow 184.

Figure 2:
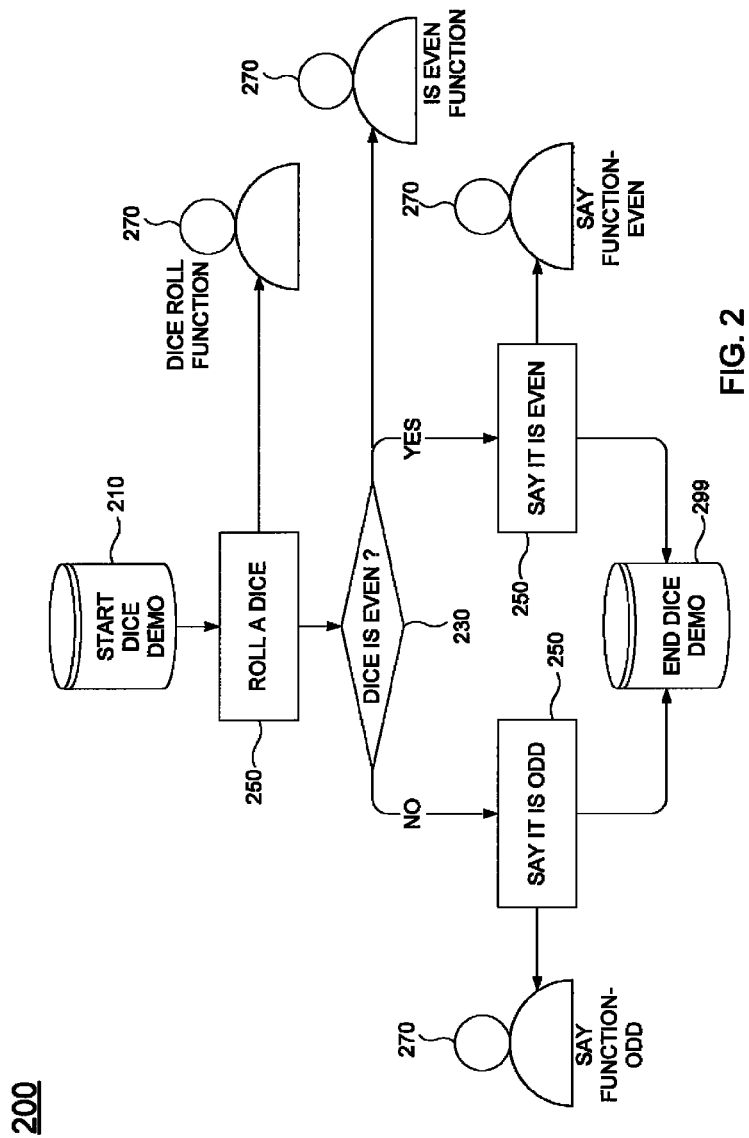
FIG. 2 illustrates an exemplary plugged-in task flow, according to one embodiment of the present disclosure.

A highly simplified example of a typical task flow is provided in FIG. 2 for purposes of illustrating the basic principles of how flows can be defined by non-programmers, e.g., using a task flow development tool having an intuitive graphical representation. In particular, FIG. 2 shows a task flow for a dice roll where a simulated dice roll may be invoked and an outcome can be provided (e.g., the dice is odd, or the dice is even). Note that there is a starting block, 201, ending block 299, decision block 230, action blocks 250 and corresponding actions 270. These are typical components that are representative of a task flow. However, other task flow components, (i.e., junctions, forks, and the like) may be included in a task flow, such as a domain-specific task flow 184, according to various embodiments of the present disclosure. It should further be noted that the task flow plug-in 184, in various embodiments, may not be strictly in the form of graphical task flow 200 as shown in FIG. 2 (which is preferably more suitable for use in task flow development and developer visualization) but is rather in a preferred format for run-time computer execution (e.g., an XML (Extensible Markup Language) document that is automatically derived from the graphical task flow), and instructs the computer processor or other device, under the control of generic virtual personal assistant platform 110 to follow the defined task flow).

Returning to an example of a banking application, the user intent arguments from sentence-level understanding module 130 may comprise the phrase "check account balance." The interpreter 140 may determine that this corresponds to one of several valid options at a particular decision point (e.g., a decision block) in the task flow. As such, the interpreter 140 may decide that the user's intent, with respect to the domain-specific task flow, is to proceed according to this option of the task flow.

In one embodiment, the decision of the interpreter 140 is passed to the reasoner 150. The decision of the interpreter 140 may take the form of interpreter intent arguments which contain instructions, annotations, metadata and the like, which convey an intent to proceed in the task flow according to the user selected option. Note that the interpreter 140 may follow a generic task flow that is part of the generic virtual personal assistant platform 110. However, when a domain-specific plug-in 180 is loaded into the generic virtual personal assistant 110, the interpreter 140, in one embodiment, will follow the plug-in task flow 184. In this regard, it should be noted that the generic virtual personal assistant platform 110 may be configured for various applications and deployments by simply providing different domain-specific plug-ins 180.

In any event, the interpreter 140 outputs interpreter intent arguments which represent the interpreter's decisions regarding what is the user intent, based upon the output of the sentence level understanding module 130 and the domain-specific task flow plug-in 184, and in some cases also based on feedback from reasoner 150 (as described below).

Reasoner 150 performs tasks responding to the user intent (as determined by the interpreter 140), by also using the domain-specific plug-in task flow 184. In some embodiments, reasoner may also provide a qualitative indication about its decision making processes (e.g., an indication estimating the likelihood or confidence that a particular decision is correct). The reasoner 150 preferably maintains the context and performs its task(s) according to the context. For example, the reasoner 150 may learn from the interpreter 140 that the user's intent corresponds to the task flow option "check account balance." In such case, the reasoner 150, based upon the plug-in task flow 184 may determine that a bank account number is also required as input from the user. In this example, the reasoner 150 may provide this information back to the interpreter 140 such that the interpreter 140 will be disposed to expect a bank account number in the near future. Thus, for instance, if the interpreter 140 receives a string of numbers and/or letters in the next round of dialog, it will tend to interpret that input as the specified account number for purposes of the "check account balance" task, and will be less likely to misinterpret this as a desire for some other action in the plug-in task flow 184. At the same time, in this example, reasoner 150 may provide instructions, or reasoner intent arguments, to natural language generation module 160. For instance, reasoner 150 may determine that the user should be prompted to say or enter an account number and/or password for the desired account balance to be checked. Accordingly, the reasoner 150 may send instructions to natural language generation module 160 to create an appropriate output (i.e., a request to speak/enter the desired account number) at the same time as the reasoner 150 is instructing the interpreter 140 to expect a particular type of input from the user (i.e., in response to the prompt to be output by the natural language generation module 160).

In some embodiments, reasoner 150 may also receive a user's profile as input, and/or learn an individual user's preferences over time, and adapt its modeling of that user's intent and its behavior with respect to that user accordingly.

In general, the reasoner 150 determines task(s) to execute in response to the user intent, and sends instructions to other devices, modules, processors, etc. to execute the task, or a portion of such task. A task may comprise an action to be taken in response to one or more triggers according to a plugged-in task flow. For example, one action/task may be executed in response to one trigger, whereas a second action/task may be executed in response to another trigger. In one embodiment, the reasoner 150 may determine a task to execute that involves generating a spoken or natural language response to a user. In such case, reasoner 150 may forward instructions to natural language generation module 160 in order to formulate an appropriate response. However, it should be understood that in some embodiments, the reasoner 150 may determine that a response should comprise a non-audio/non-speech output. For example, the reasoner 150 may determine that an action should comprise generating a particular display on a region of a screen (e.g., display 192), such as displaying an account balance at an ATM or on a computer screen, instead of providing an account balance in audio/natural language/speech form. This may be desirable to protect the user's privacy and for security purposes, such as in a public setting. Other elements of the task flow/interaction with the generic virtual personal assistant platform 110 may comprise natural language output, in spoken and/or written form.

As noted, the reasoner 150 may send instructions to one or more supporting modules for performing a task/executing an action. For example, if the reasoner 150 determines that the user's intent is to check a bank balance, the action(s)/task(s) it determines to execute, may include generating a spoken response to the user informing that the information is being retrieved as well as sending instructions to a service module 193 to interface with an appropriate server to retrieve the user's account information from a database. All of these instructions output from the reasoner 150 may, in some embodiments, be referred to as "reasoner intent arguments."

It should be noted that in some embodiments, interpreter 140 and reasoner 150 may, in fact, be integrated within a single module (e.g., a generic task reasoning module) that provides the functionalities of both the interpreter 140 and reasoner 150 described above.

As implied above, natural language generation module 160 is configured to generate a natural language response in accordance with a task/action determined by the reasoner 150. In one embodiment, natural language generation module 160 may generate a series of text strings in a stream or file which are passed to voice/speech synthesizer 191. In one embodiment, natural language generation module 160 generates instructions in the form of annotated text, such as SABLE, speech synthesis markup language (SSML), spoken text markup language (STML) or Java speech markup language (JSML), which are all examples of markup languages which may be used to annotate text for text to speech conversion applications. In any case, natural language generation module 160 may send instructions to a voice synthesizer 191 for further processing.

In one embodiment, voice synthesizer 191 may simply store and invoke prerecorded announcements which are played in response to different instructions from the natural language generation module 160. In other embodiments, voice synthesizer 191 may comprise a text to speech synthesizer such as CEPSTRAL's VOICEFORGE, or similar technology. The generated sound/voice/speech signal may be output to an attached speaker or headset (e.g., in the case where the generic virtual personal assistant platform 110 is implemented in a personal computer, laptop computer, mobile device and the like) or may be output to a port or other connection to internal or external network(s). For example, generic virtual personal assistant platform 110 may be implemented as a web server attached to a WAN or the internet and it accessed by users via other devices connected to the network. In such case, the output may be sent from the generic virtual personal assistant platform 110 back to the user's device over one or more networks.

In some embodiments, the generic virtual personal assistant platform 110 is configured to utilize additional information such as personalization information, date and time information, geographic or other location information, and other information. Such additional information may be in the form of additional run-time specifications, models, or plug-ins, and may be stored in memory 170. In any case, the additional information may be made available to one or more of the modules of the generic virtual personal assistant platform 110. Accordingly, the additional information may represent and provide access to internal and external information required to perform deep understanding of an evolving dialog, the user and/or the surrounding environment. For example, the virtual personal assistant system 100 may store information of prior user interactions with the system. For instance, context information, such as user intents (e.g., user intent arguments, commonly spoken words or phrases), records of frequently executed tasks or actions in a task flow, dates, days of the week, and times that the user is interacting with the system, the user's location (e.g., a home computer, a home phone, a cellular phone or other mobile device, etc.), and similar user-related information from prior and current interactions of the user with the virtual personal assistant system 100 may be stored, e.g., in memory 170, for use by the various modules.

For example, interpreter 140 may use prior context information in determining a user intent with respect to the plug-in task flow 184. For example, in 90% of a user's prior interactions with the virtual personal assistant system 100, the user may have checked an account balance for a checking account, whereas the user has both checking and savings accounts. The interpreter 140 may indicate to the reasoner 150 (e.g., via the interpreter output in the form of interpreter intent arguments) that the user's intent is likely to check the checking account balance, with a 90% confidence. Based upon the plug-in task flow 184 and/or the domain-specific language models 182, the reasoner 150 may determine that the task flow should follow a path involving retrieving checking account information. However, at the same time the reasoner 150 may also determine that a response should be provided to the user stating that the checking account balance is being retrieved, but that if this is incorrect, that the user should say so. In other words, the interpreter 140 and/or reasoner 150 may assume particular user intents with higher likelihood based upon the past intents. In this way, the most common tasks invoked by the user (i.e., checking the checking account balance) may be prioritized and expedited, while at the same time leaving open the possibility for the user to correct the assumptions of the interpreter 140 and or reasoner 150.

As such, the domain-specific task flow may dictate multiple rounds of ongoing dialogs between a user and the virtual personal assistant system 100. Thus, in some embodiments, not only does the interpreter 140 and/or reasoner 150 consider a current intention of the user, but may also take into account past intentions of the user as expressed in previous rounds of the dialog. For example, the reasoner 150 may additionally rely upon information stored in memory, such as the prior context information, in order to inform its own decision making process. For example, the interpreter 140 may make a decision that is a "best guess" as to a user intent, while the reasoner 150 is left to decide how to respond to such user intent (e.g., as indicated to the reasoner via interpreter intent arguments output from the interpreter 140). For example, the interpreter 140 may provide a decision as to a user intent, but there may be parameters missing from the input that are expected for the desired transaction. For example, according to the domain-specific task flow 184 and/or domain-specific language models 182, a user wishing to check a checking account balance may need to identify and authenticate himself before the system will present the desired information. In such case, the reasoner 150 may determine that the user should be prompted to provide such information, and that the interpreter 140 should look for such information to follow. However, a user may be calling from a known, authorized phone number, computer, or similar endpoint device, or is calling from a particular location (e.g., from a known home or work address) in which case, the reasoner 150 may determine that the user is sufficiently credible and that the user need not be prompted for additional information.

In addition, personalization information and the like may be utilized by the reasoner 150, (e.g., in the form of a personalized grammar) to supplement the intent arguments from the interpreter 140. For example, the system 100 may "learn" a user's geographic patterns (e.g., based on calling phone number(s), global positioning information from a cellular phone, computer, mobile device or other calling device) and determine that a user spends 80% of his time in New York and 20% of his time in Boston. Suppose the user is interacting with a system 100 configured to provide a restaurant recommendation according to a related plug-in task flow 184. Further suppose that the user input to the system expresses the desire to know of That restaurants "near downtown." The term "downtown," in isolation, provides minimal geographic description (e.g., "downtown," without knowing which town, is unhelpful). However, based on the user's typical patterns, the reasoner 150 may favor traversing the plug-in task flow 184, performing actions and responding to the user with the assumption that the user is looking for restaurants pertaining to the cities of New York (with 80% likelihood) and Boston (with 20% likelihood). If the current global positioning information of the user is available to the system 100 (e.g., it is known that the user is in Cambridge, Mass., very close to Boston proper), then the reasoner 150 may adjust its determination that the user is asking for That restaurants "near downtown Boston, Mass." (with, say a 90% confidence level). The reasoner 150 may therefore perform actions and traverse the plug-in task flow 184 accordingly.

Similarly, personalization information may further be utilized by the input module 120 and/or sentence level understanding module 130 (e.g., a personalized grammar to supplement the built in grammar 132). For example, based on prior interactions of the user with the system 100, the system 100 may "learn" that the user spends time in Boston, Mass. and has had interactions with the system pertaining to the Boston Red Sox. As such, the term "Sox" or the phrase "the Sox" may be added to a personalized grammar, As an example, the sentence level understanding module 130 may receive the following input text "when is the next socks home game". Based on the context of the sentence and/or a personalized grammar (that indicates the user's connection to Boston and, in particular, the Boston Red Sox), the sentence level understanding module 130 may determine that the word "socks" should be corrected to "Sox" and that the text should be annotated or further revised to indicate that the phrase "the Sox" means the "Boston Red Sox" (as opposed to the Chicago White Sox or simply "socks").

In this regard, it should be noted that in some cases, the domain-specific language models 182 may provide the necessary context for the sentence level understanding module 130 to make such decisions. For example, the system 100 may be configured as an electronic ticket ordering system for sporting events. Thus, for example, the plug-ins 180 may define relevant task flows and language models pertaining to and describing particular sports, teams, arenas, and the like. As such, the sentence level understanding module 130 may override a generic grammar 132 with domain-specific information to determine that a user is asking about tickets for the Boston Red Sox, as opposed to calling to talk about "socks." As such, the sentence level understanding module 130 may parse phrases or sentence, and correct and annotate the text (e.g., with metadata) based upon the particulars of the domain (i.e., according to the domain-specific plug-in(s) 180).

In general, the plugged-in language models 182 may include grammar rules and semantic information (such as proper nouns, people's names, place names, email addresses, phrases, telephone numbers, dates, times, addresses, and the like) which are specific to the particular domain. For example, a virtual personal assistant developer (such as a developer of a retail bank-by-phone application) may define grammar rules and semantic rules which facilitate the correct understanding of the phrase "check balance". For instance, the phrase "check balance" may have a particular meaning in the context of a banking domain (e.g., get information on how much money is in a bank account), whereas "check balance" may mean something entirely different in the context of an automotive care domain (e.g., ensuring proper distribution of weight over car tires).

In one embodiment, domain-specific task flow 184 may be defined by a business developer using a computer-assisted flow development tool to convert a graphical representation of a task flow into a set of run-time specifications. A task flow may comprise a flow diagram representing a dialog based application, or more specifically, an executable derived from a task flow diagram (e.g., in the form of an XML document, or similar programming code). Thus, the plug-in domain-specific task flow 184 may be pre-compiled and translated into a set of computer readable and computer executable instructions, such as one or more XML documents that can be interpreted by reasoner 150, interpreter 140, and other components of the generic virtual personal assistant platform 110.

Collectively, the virtual personal assistant system 100 has been described as assisting a user with one or more desired tasks with respect to domain-specific models (e.g., a domain-specific task flow and/or domain-specific language models), through the above described functionalities of the various components of the virtual personal assistant system 100. In one embodiment, the various components of virtual personal assistant system 100 are located within a single device, such as a single desktop computer, a single mobile device, a single laptop computer, etc. However, in other embodiments, one or more components of virtual personal assistant system 100 may reside on separate physical devices, for example, the input module 120 and sentence level understanding module 130 may reside on a first server, the interpreter 140 and reasoner 150 may reside on a second server, and natural language generation module 160 (and, in some embodiments voice synthesizer 191) may reside on a third server. Numerous other configurations of this nature are possible in accordance with various embodiments.

Figure 3:
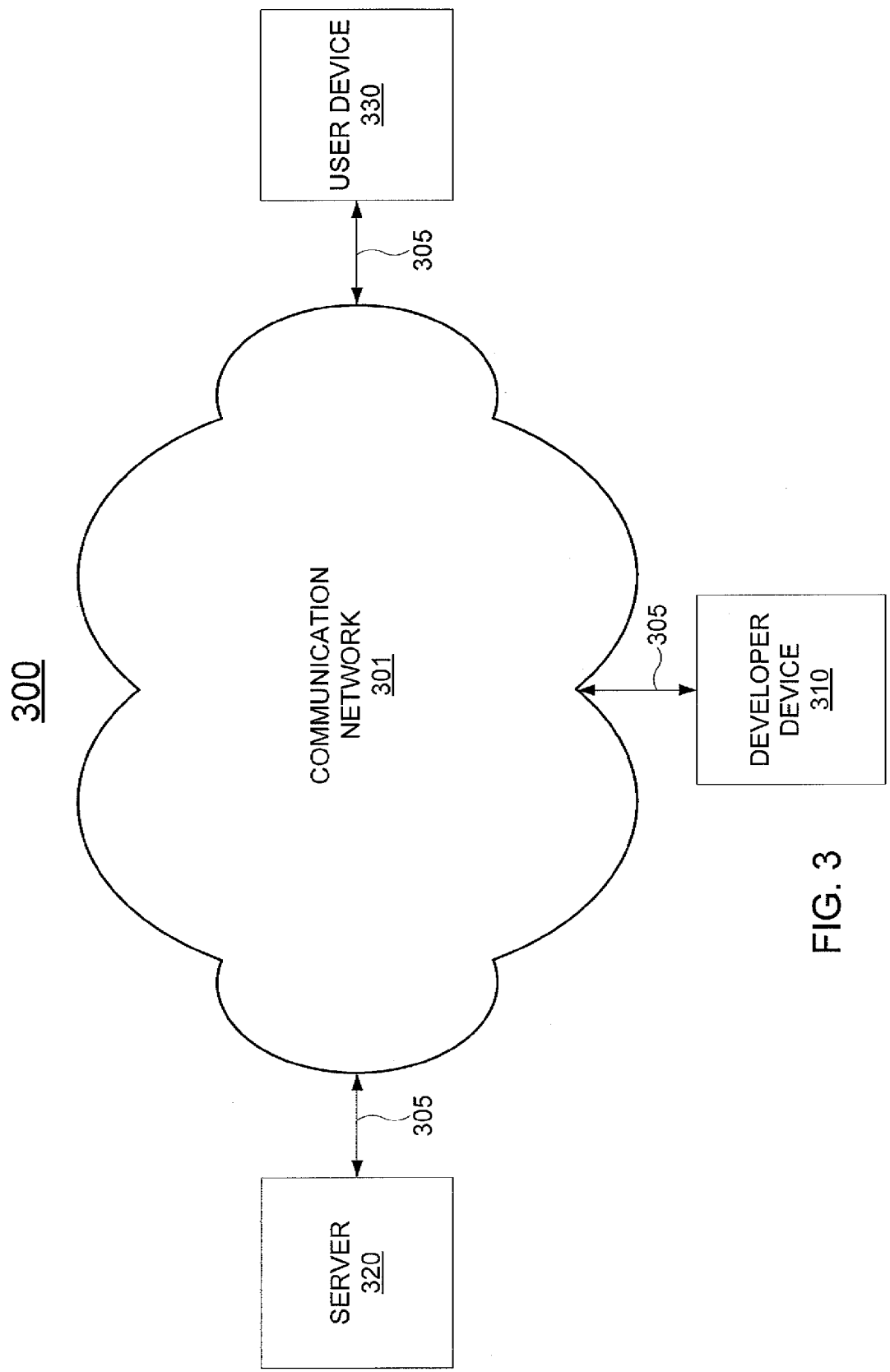
FIG. 3 illustrates a high-level block diagram of a network and associated component devices suitable for use in performing the functions described herein.

To better understand the present disclosure, FIG. 3 illustrates an example system 300, in which embodiments of the present disclosure are implemented in a networked environment. By way of example, a developer of a banking application may develop plug-ins for a virtual personal assistant, such as a task flow and language models, which are provided to another party for deployment in an off-site generic virtual personal assistant platform. For example, the bank may contract with a vendor for web-hosting or customer service call center services. In addition, a website or call center provided by the vendor for the bank may implement one or more virtual personal assistant systems for engaging users/callers that visit the website or call the customer service call center. As such, a virtual personal assistant system may be deployed at the vendor's site (e.g., on a server), whereas the plug-ins to configure the generic virtual personal assistant platform are created at the bank's location. Similarly, embodiments of the present disclosure may provide virtual personal assistant systems that interact with users over a network (as opposed a stand-alone virtual personal assistant). For example, a user may call a customer service call center where the user's call is answered by a virtual personal assistant. The virtual personal assistant may determine that images should be displayed or sounds be provided to the user at various junctures in a task flow being followed by the virtual personal assistant. However, the actual display or audio output may occur on the user's device remote from the virtual personal assistant itself.

As an example of an environment suitable for implementing such network-based embodiments, system 300 includes communication network 301, developer device 310, server 320 and user device 330, suitable for developing, providing and utilizing virtual personal assistant systems. In the example of FIG. 3, each of the developer device 310, server 320 and user device 330 is coupled to the communication network 301 through links 305. Although each of the links 305 is shown as a single bidirectional link between a respective device and communication network 301, this is merely a logical depiction. For example, any of links 305 may comprise multiple physical links, wireless channels, and intermediate devices, such as a number of routers, switches, and the like. In addition, one or more intermediary networks may be traversed by each of the links 305 in connecting the respective devices to the communication network 301. In one embodiment, the communication network 301 comprises a packet network, such as the Internet. Broadly, the communication network 301 comprises any physical medium (as well as wireless arrangements) capable of interconnecting developer device 310, server 320, user device 330, and other devices, for purposes of data communication.

In one embodiment, each of the developer device 310, server 320 and user device 330 comprises a general purpose computer configured to perform one or more of the particular functions described herein. An exemplary general purpose computer in which all or a portion of the respective functions may be performed is described below in connection with FIG. 5. In one embodiment, developer device 310 comprises a workstation where various plug-ins, such as task flows and language models, may be developed by a developer such as a programmer, a domain expert (e.g., a banker developing a banking task flow and related language models, a customer service manager developing a customer service task flow, etc.) and others. For example, developer device 310 may be a workstation comprising a general purpose computer suitable for programming, creating, debugging, installing and running various applications.

Similarly, server 320 may comprise a server configured to install and run various applications. For example, server 320 may comprise a web-server or a web-hosting server, a file-transfer protocol server, a firewall device, a switch, a router, a media server, and the like that is suitable for installing, running and hosting various applications, such a virtual personal assistant system and/or a generic virtual personal assistant platform. In one embodiment, server 320 is deployed by a vendor or other third-party providing at least one generic virtual personal assistant platform. Accordingly, in one embodiment the developer device 310 may provide via the communication network 301 and links 305 one or more plug-ins to the server 320 for deployment within, or configuration of the at least one generic virtual personal assistant platform. As described above, a generic virtual personal assistant platform, properly configured with a plug-in task flow and/or language models, may provide a domain-specific virtual personal assistant system.

Accordingly, in one embodiment a user of user device 330 may interact with a virtual personal assistant system residing on server 320 via the communication network 301 and links 305. For example, user device 330 may comprise a telephone, cellular phone or similar device, and server 320 may reside at a customer call center location. Thus, the user may call the customer call center via user device 330 where the call is answered by a virtual personal assistant system residing on server 320. Similarly, user device 330 may comprise a personal computer, smart phone or similar device that connects to a bank website hosted on server 320. The website may provide, as part of its interface, an online virtual personal assistant system to assist users with banking tasks. In any case, the user, via user device 330, may interact with a virtual personal assistant system residing on server 320 using various forms of input (e.g., natural language input, spoken input, and other forms of input, as described herein).

It should be noted that each of the user device 330, developer device 310 and server 320 may comprise multiple devices. For instance, the server 320 may actually comprise a grouping of physically distinct servers that logically function as a single server 320. Similarly, developer device 310 may actually comprise a cluster of co-located computers, workstations, smart phones, cellular phones, personal digital assistants, mobile communication devices, and the like, or even a group distributed devices. Additional details and variations of this nature are omitted for simplicity and to improve clarity of understanding with respect to the claimed embodiments. Broadly, the present disclosure may include any other, further or different network configuration that is suitable for developing, providing and utilizing a virtual personal assistant. Similarly, the present disclosure may include embodiments in a non-networked environment (e.g., in a standalone device, such as a personal computer, a laptop computer, a personal digital assistant, a kiosk, such as an automated teller machine, a vending machine, and the like). Furthermore, any one or more of server 320, developer device 310 and user device 330 may comprise a computer, a server, or similar device configured to perform the various functions described below in connection with the exemplary method 400.

Figure 4:
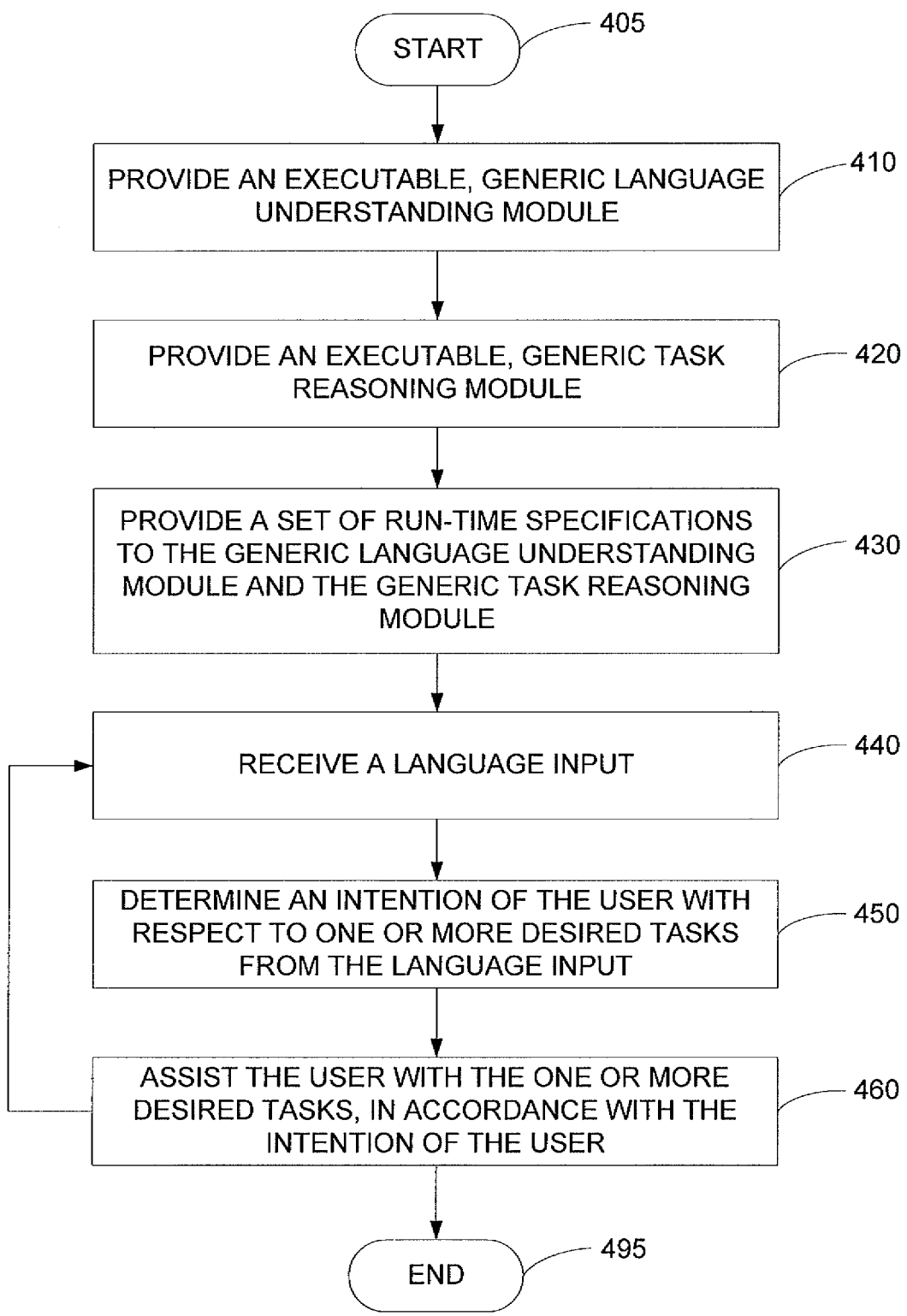
FIG. 4 is a flow diagram of a method for assisting a user with one or more desired tasks within a domain, according to one embodiment of the present disclosure.

FIG. 4 is a flow diagram illustrating one embodiment of a method 400 for assisting a user with one or more desired tasks within a domain, according to the present disclosure. The method 400, or at least portions thereof, may be implemented, for example, by the virtual personal assistant system 100 illustrated in FIG. 1 (or a server or other device implementing the virtual personal assistant system, e.g., as shown in FIG. 3). As such, reference may be made in the discussion of the method 400 to various components of the generic virtual personal assistant platform 110, as well as other components of the virtual personal assistant system 100. However, the method 400 is not limited to implementation by a virtual personal assistant system configured in accordance with FIG. 1, and may, in fact, be implemented by a system/device(s) having alternative configurations and components. For example, the method may be performed by the general purpose computer illustrated in FIG. 5, specifically programmed to perform steps of the method 400 (e.g., instructions stored in a virtual assistant module and/or memory and executed by a processor).

The method 400 is initialized at step 405 and proceeds to step 410, where the method provides an executable, generic language understanding module. For example, in one embodiment a generic language understanding module comprises a sentence level understanding module that can be executed (e.g., by a processor). In one embodiment, a sentence level understanding module comprises at least a grammar and a statistical parser. In some embodiments, a sentence level understanding module further comprises a hybrid, a lexicon, syntactical rules and/or other components. An exemplary sentence-level understanding module 130 is described above in connection with FIG. 1. In various embodiments of the present disclosure, the generic language understanding module may also be configured to implement a set of run-time specifications in the form of one or more domain-specific models, or plug-ins, as described in further detail below in connection with step 430.

In some embodiments, the generic language understanding module provided at step 410 may also include an input module in addition to a sentence-level understanding module. For example, an input module, according to various embodiments, may be configured to take any number of different kinds of inputs, e.g., a language input or natural language input in the form of speech or text, a video, gestures, a click on a region of a display (e.g., a click on an online form), and the like, and convert to text. In various embodiments, the input module passes a text output to the sentence level understanding module. An exemplary input module 120 is described above in connection with FIG. 1. In addition, in still other embodiments, a generic language understanding module may also include an interpreter component (e.g., interpreter 140 in FIG. 1) which may provide context-level awareness and understanding.

Following step 410, the method 400 proceeds to step 420 where an executable, generic task reasoning module is provided. For example, in some embodiments a generic task reasoning module may include a reasoner component (e.g., reasoner 150 in FIG. 1). In some embodiments, a generic task reasoning module may also include an interpreter component (e.g., interpreter 140 in FIG. 1).

For example, an interpreter may comprise a generic component that is configurable, or configured to implement a set of run-time specifications, including a domain-specific task flow, as described in further detail below in connection with step 430. An example of a simplified task flow is provided in FIG. 2. In one embodiment, the interpreter is configured to extract a user intent from an annotated text, which the interpreter accepts as an input. For example, the interpreter may receive an input in the form of annotated text from an executable, generic language understanding module provided at step 410 (or from a sentence level understanding module that is a component thereof). The interpreter then extracts a user intent from the input annotated text. In one embodiment, the interpreter makes decisions regarding the user intent by considering the input annotated text in connection with a plug-in task flow, described below.

In various embodiments, the generic task reasoning module provided at step 420 also includes a reasoner that performs tasks responding to a user intent (e.g., as determined by the interpreter). In some embodiments, the reasoner also implements a domain-specific plug-in task flow as described in further detail below in connection with step 430. The reasoner may be responsible for maintaining a context and providing a qualitative indication about its decision making processes (e.g., an indication estimating the likelihood or confidence that a particular decision is correct). Thus, in some embodiments the reasoner may also perform its task(s) according to the context. In some embodiments, the reasoner may also learn a user's profile and preferences and adapt its behavior accordingly. Some of the actions which the reasoner may take include: providing feedback information to the interpreter, providing feedback to the generic language understanding module, providing instructions to output devices, and other actions. In general, the reasoner determines task(s) to execute in response to the user intent, and send instructions to other devices, modules, processors, etc. to execute the task, or a portion of such task.

In step 430, the method 400 receives a set of run-time specifications (e.g., domain-specific plug-in(s), such as plug-ins 180 in FIG. 1). For example, the method may receive domain-specific language model(s) and a domain-specific task flow which may comprise one or more instructions in the form of one or more XML documents. In one embodiment, the domain-specific task flow is used to configure the generic task reasoning module provided in step 420.

The run-time specification may also include one or more domain-specific language models. For example, a developer may define domain-specific language models that might contain definitions associating names of objects such as classes, relations, functions, and the like with human-readable text describing what the names mean, and formal axioms that constrain the interpretation of such terms as user defined codes, types, calls to particular servers, databases and legacy systems, etc. The domain-specific language models may include grammar rules and semantic information (such as proper nouns, people's names, place names, email addresses, phrases, telephone numbers, dates, times, addresses, and the like) which are specific to the particular domain. For example, a virtual personal assistant developer (such as a developer of a retail bank-by-phone application) may define grammar rules and semantic rules which facilitate the correct understanding of the phrase "check balance". For instance, the phrase "check balance" may have a particular meaning in the context of a banking domain (e.g., get information on how much money is in a bank account), whereas "check balance" may mean something entirely different in the context of an automotive care domain (e.g., ensuring proper distribution of weight over car tires).

At step 430, the method 400 may further configure the generic language understanding module and the generic task reasoning module provided at steps 410 and 420 respectively, with the set of run time specifications (e.g., a domain-specific task flow file and one or more domain-specific language models). For example, a domain-specific task flow file may be incorporated into or made available to the generic task reasoning module. Similarly, domain-specific language model (s) may be made available to or incorporated in the generic language understanding module. Once the set of run-time specification (e.g., a domain-specific task flow file and one or more domain-specific language models) are incorporated into or made available to the generic task reasoning module and the generic language understanding module, the generic task reasoning module and the generic language understanding module, collectively, are effectively transformed into a domain-specific virtual personal assistant system that is configured for a particular domain in accordance with the run-time specifications. Such, a domain-specific virtual personal assistant system is thus configured to receive and process an input in accordance with the run-time specifications in order to determine various user intents and respond appropriately to such intents.

Accordingly, in step 440, the method 400 receives a language input. In one embodiment, the language input may comprise annotated text (e.g., received from an input module). In other embodiments, the input may comprise analog or digital voice signals (e.g. speech), a video file, text (e.g., un-annotated text), and other inputs. For example, a user may call a designated telephone number (e.g., a 1-800 number or other toll free number) which connects the caller to an interactive voice response system or server. The method may then prompt the user to briefly describe the reason for the call. The method 400 may include recording the user's speech into an audio file or audio stream.

When the user is finished speaking (or simultaneous with the user speaking) or when the entire audio stream/file is received, the method 400 proceeds to step 450. In step 450, the method 400 determines a user intention from the language input (e.g., from the audio stream). In one embodiment, the method 400 converts the audio stream to a text file, or text stream and performs a language understanding process (e.g., a natural language understanding process) on the text to generate understood language. In one embodiment, the language understanding process attempts to discern semantic information from the text (i.e., not only the words in the text, but the boundaries of phrases, and the meanings of such phrases and words within the particular context or domain). For example, the language understanding process may involve sub-steps of tokenizing, speech tagging and determining phrases, among others. Speech tagging may involve recognizing parts of speech, such as direct objects, verbs and indirect objects. In one embodiment, the method 400 performs the natural language understanding process and its sub-steps (such as tokenizing, tagging and phrase determining sub-steps) by implementing tools such as a grammar, a lexicon, syntactical rules, and a parser in addition to the domain-specific language model(s) received at step 430.

In one embodiment, following the performing of the language understanding process (e.g., via the generic language understanding module), the method 400 may output the results of the analysis (which, in some embodiments is referred to as "user intent arguments"), which is representative of the user's intent. In one embodiment, the output may take the form of annotations to the input text. For example, in order to keep track of the phrase boundaries determined by a phrase determination sub-step, the method 400 may include text annotations or metadata along with a text output. In the example described above, if the phrase "check balance" is found in a text stream, the method 400 may tag the text with metadata noting the meaning/intention of the phrase as "get information on how much money is in a bank account".

Also in step 450, the method 400 further processes the understood text/speech (e.g., the annotated text) to determine a user intent based on the run-time specifications received at step 430. In one embodiment, the method 400 determines the user intent via the generic task reasoning module. In one embodiment, the method 400 applies the intention of the user to a task flow according to a domain-specific task flow plug-in included in the run-time specifications. For example, if the method 400 annotates an input text via a generic language understanding module with an indication that "check balance" is a phrase that should be interpreted as a whole, the generic task reasoning module may, having been configured with a domain-specific task flow plug-in, determine that "check balance" indicates an intention to "get information on how much money is in a bank account." In other words, the method 400 may then compare the user's intention to a number of options in the domain-specific task flow. For example, if a user expresses an intention to check the bank balance; the method 400 must first determine that this corresponds to an option in the task flow. The method may, for example, examine the task flow file to determine the action that best corresponds to the intention. For example, a check bank balance action may be triggered by receiving an input expressing an intention to check the bank balance. In one embodiment, the method 400 determines the intention of the user according to the task flow file using an interpreter of the generic task reasoning module, which outputs instructions in the form of intents/arguments to a reasoner of the generic task reasoning module, which completes actions in accordance with the determined intentions.

Accordingly, at step 460, the method 400 assists the user with one or more desired tasks, such as content search, content retrieval, transaction completion, and the like, in accordance with the determined intention of the user. For example, the method 400 may refer to a domain-specific task flow file (e.g., one of the components of the run-time specifications provided at step 430). For example, if at step 450, the method determines that the intention of the user is to check an account balance, the domain-specific task flow may indicate that a corresponding action involves prompting a user to enter an account number and password on a keypad. In one embodiment, the method 400 determines actions to perform in accordance with the user intention(s) via a reasoner (e.g., one of the components of the generic task reasoning module).

In general, at step 460 the method 400 will determine the correct or best matching action to take in response to a specific trigger or intention. In some cases, a user intention may not be determinable by the method 400 at step 460. For example, an input text may contain no annotations, or an annotation that the input speech is indeterminable, based on the domain-specific task flow. In some embodiments, the indeterminate nature of the input speech is itself a trigger in the task flow with a particular corresponding action. For instance, indeterminate speech may cause the method 400 (e.g., via a reasoner configured with a domain-specific task flow), to follow a dialog path that includes generating a response to the user indicating that the user was not understood and suggesting to the user to try again. In addition, the action may comprise further providing some suggestions to the user such as more common or standard expressions used for conveying intentions that correspond to valid options for the task flow to follow.

In one embodiment, the method 400 assists the user with a desired task by generating a response based on the determined intent (or lack thereof). In the example, described above, if the method 400 determines that a user wants to check a bank account balance (the "trigger"), the plugged-in task flow file may indicate to the method that the user should be prompted to enter an account number and password on a keypad (the corresponding "action"). In one embodiment, the method 400 may cause a prerecorded announcement to be played asking the user to enter the account number and password. For example, the method 400 may, via the generic task reasoning module, send instructions to an output module, such as a display, a natural language generating unit, and the like.

If the task flow ends after the method 400 takes a particular action or provides a particular response at step 460, the method proceeds to step 495 where the method terminates. However, in many cases, the task flow will involve an intermediate step. For example, if the method 400 has just determined a user wants to check a bank account balance and sent a natural language response to the user requesting the user provide further information, the method may return to step 440 to receive further language input from the user (e.g., further spoken input, keypad entries, facsimile signals, gestures, and the like). In addition, as mentioned above, the method 400 may (e.g., via the generic task reasoning module) advance a task flow to a different state/step and store the current state such that, when further audio input is received in subsequent iterations of step 440, it will be processed at step 460 in accordance with the new step/state of the task flow. Accordingly, in one embodiment, the method 400 provides feedback (e.g., from a reasoner to an interpreter of the generic task reasoning module) updating the state of a domain-specific task flow as it proceeds from one round of an ongoing dialog to the next. In addition, if at step 460, the method 400 determines that additional inputs are specifically required to perform/execute a particular task in accordance with the user intention, the method may provide additional feedback (e.g., from a reasoner to an interpreter of the generic task reasoning module) that particular inputs are likely to follow. For instance, if the method 400 determines that a user's intention is to check a bank balance, the method may further determine that the user should be prompted to speak an account number and a password. Thus, the method 400 may generate an output (e.g., synthesized natural language/speech) prompting the user to speak an account number and password. In addition, the method 400 may provide feedback (e.g., from the generic task reasoning module to the generic language understanding module) that input in the form of a combination of individual letters and numbers will follow. This increases the likelihood that the method 400 will correctly interpret future input (e.g., by properly segmenting and/or annotating an input text, and the like).

As such, the domain-specific task flow may dictate multiple rounds in an ongoing dialog between a user and the method 400. Thus, in some embodiments, not only does the method 400 consider a current intention of the user, but may also take into account past intentions of the user as expressed in previous rounds of the dialog (e.g., through prior iterations of steps 440-460). In any case, when the method 400 reaches an ending point in the run-time specifications (e.g., in a domain-specific task flow), the method proceeds to step 495 where the method terminates.

Figure 5:
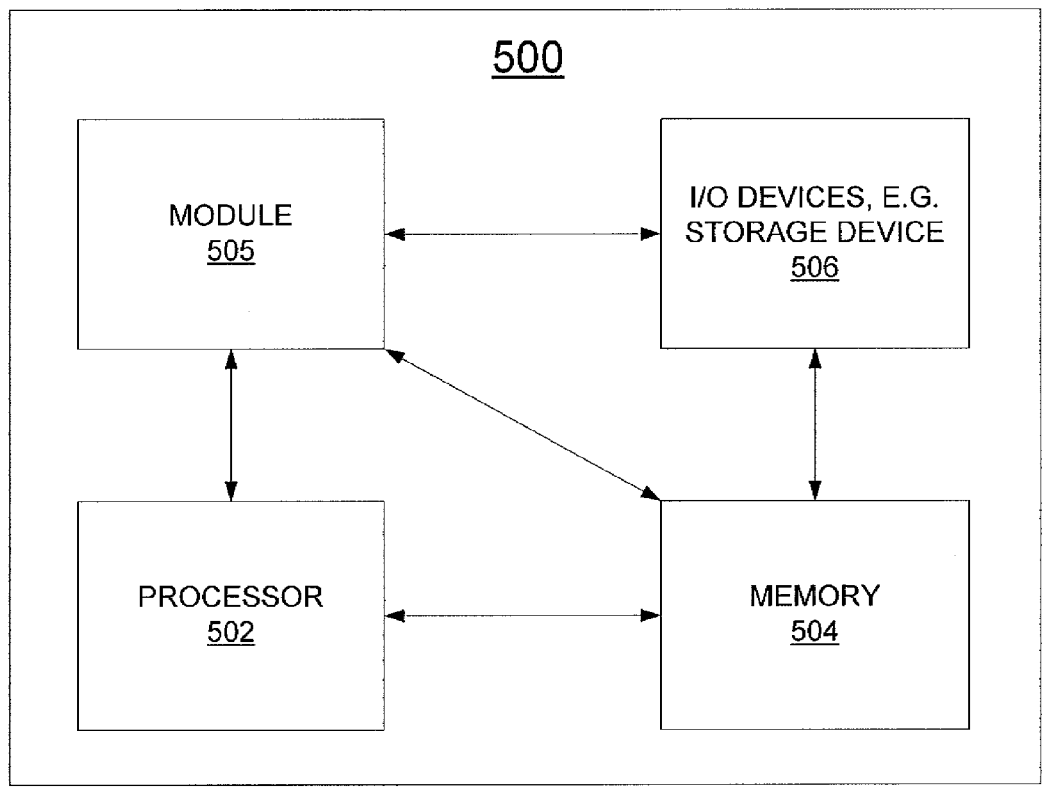
FIG. 5 illustrates a high-level block diagram of a general-purpose computer suitable for use in performing the functions described herein.

FIG. 5 is a high level block diagram of a general purpose computing device 500 that can be used to implement embodiments of the present disclosure for assisting a user with one or more desired tasks, as described above. It should be understood that embodiments of the disclosure can be implemented as a physical device or subsystem that is coupled to a processor through a communication channel. Therefore, in one embodiment, a general purpose computing device 500 comprises a processor 502, a memory 504, a virtual personal assistant module 505 implementing various embodiments of the present disclosure (e.g., method 400, virtual personal assistant system 100), and various input/output (I/O) devices 506 such as a display, a keyboard, a mouse, a modem, and the like. In one embodiment, at least one I/O device is a storage device (e.g., a disk drive, an optical disk drive, a floppy disk drive).

Alternatively, embodiments of the present disclosure (e.g., virtual personal assistant module 505) can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the virtual personal assistant module 505 for assisting a user with one or more desired tasks described herein with reference to the preceding Figures can be stored on a computer readable medium (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present disclosure have been shown and described in detail herein, those skilled in the art can readily devise many other varied embodiments that still incorporate these teachings.

What is claimed is:

1. A method, using a computer processing system, for assisting a user with one or more desired tasks within a domain, the method comprising:
   receiving, by a computing system comprising one or more computing devices, a language input from the user;
   determining, by the computing system, from the language input, an intention of the user with respect to the one or more desired tasks, by an executable generic language understanding module and a run-time specification comprising a model configured to a specific field of use; and
   performing, by the computing system, a domain-specific task in accordance with the intention of the user, by an executable generic task reasoning module and a run-time specification comprising a task flow configured to the specific field of use.

2. The method of claim 1, wherein the language input of the user comprises a portion of a dialog with the computer processing system having multiple rounds, and wherein the determining the intention of the user includes considering, during a given round of the dialog, a previous intention of the user determined during one or more previous rounds of the dialog.

3. The method of claim 1, wherein model configured to a specific field of use utilized by the generic language understanding module includes a language model.

4. The method of claim 3, wherein the language model comprises a grammar and an ontology.

5. The method of claim 1, wherein the model configured to a specific field of use that are utilized by the generic task reasoning module includes a task flow model.

6. The method of claim 1, wherein determining the intention of the user includes considering feedback from the generic task reasoning module.

7. The method of claim 1, wherein the generic language understanding module comprises an utterance-level understanding component.

8. The method of claim 1, wherein the generic language understanding module comprises a context-level understanding component.

9. The method of claim 1, further comprising providing an executable speech recognition engine for execution on the computer processing system; and wherein receiving the language input from the user includes receiving voice input from the user, and converting the voice input to text using the speech recognition engine.

10. The method of claim 1, wherein the language input comprises a natural language input.

11. The method of claim 1, further comprising receiving an additional input including at least one of: a current geographical location of the user, an interaction context of the user within a web page, an image input or a non-natural language command; and wherein determining the intention of the user includes considering the additional input.

12. The method of claim 1, wherein the desired tasks comprise at least one of: content search; content retrieval; and transaction completion.

13. The method of claim 1, further comprising: executing the one or more desired tasks with the computer processing system.

14. The method of claim 1, further comprising: generating the model configured to a specific field of use via a computer-assisted development tool to convert a graphical representation of at least one task flow into the set of run-time specifications.

15. A virtual personal assistant platform embodied in one or more non-transitory computer-readable media, the virtual personal assistant platform configured to cause a computing system comprising one or more computing devices to:
   receive, by a computing system comprising one or more computing devices, a language input from the user;
   determine, by the computing system, from the language input, an intention of the user with respect to the one or more desired tasks, by an executable generic language understanding module and a run-time specification comprising a model configured to a specific field of use; and
   perform, by the computing system, a domain-specific task in accordance with the intention of the user, by an executable generic task reasoning module and a run-time specification comprising a task flow configured to the specific field of use.

16. The platform of claim 15, wherein the language input of the user comprises a portion of a dialog with the computer processing system having multiple rounds, and wherein the determining the intention of the user includes considering, during a given round of the dialog, a previous intention of the user determined during one or more previous rounds of the dialog.

17. The platform of claim 15, comprising a sentence level understanding module configured to derive an understanding of a fragment of the language input.

18. The platform of claim 17, wherein the sentence level understanding module comprises a rule-based grammar module configured to parse the language input, and a statistical parser module configured to parse the language input if the rule-based grammar module fails to confidently parse the input.

19. The platform of claim 18, comprising an interpreter module configured to analyze a user intent argument output by the sentence level understanding module and output an interpreter intent argument.

20. The platform of claim 19, comprising a reasoner module configured to use the task flow configured to the specific field of use and the interpreter intent argument to determine a task to be performed by the computing system.

21. The platform of claim 20, wherein (i) the reasoner module is configured to output, to the interpreter module, a reasoner intent argument indicative of the determined task to be performed, and (ii) the interpreter module is configured to use the reasoner intent argument to analyze the user intent argument output by the sentence level understanding module.

22. The platform of claim 20, wherein the interpreter module is configured to compute a confidence level indicative of a level of certainty associated with the interpreter intent argument and output the confidence level to the reasoner module.

23. The platform of claim 20, wherein the reasoner module is configured to learn a preference of the user over time and use the learned preference to determine the task to be performed by the computing system.

24. The platform of claim 20, wherein the reasoner module is configured to output a reasoner intent argument indicative of the determined task to be performed, and the platform comprises a natural language generation module configured to generate a natural language response to the language input of the user based on the reasoner intent argument.

25. The platform of claim 20, wherein the reasoner module is configured to output a reasoner intent argument indicative of the determined task to be performed to a service module, and wherein the service module is configured to interface with a server to retrieve information from a database.

26. The platform of claim 20, wherein the reasoner module is configured to (i) determine that a parameter needed to perform the task is missing from the language input and (ii) cause the user to be prompted for the missing parameter.

27. The platform of claim 20, wherein the reasoner module is configured to utilize personalization information to determine the task to be performed by the computing system.

28. A computing system for assisting a user with one or more desired tasks within a domain, the computing system comprising one or more computing devices configured to:
    receive, by a computing system comprising one or more computing devices, a language input from the user;
    determine, by the computing system, from the language input, an intention of the user with respect to the one or more desired tasks, by an executable generic language understanding module and a run-time specification comprising a domain-specific plug-in model configured to a specific field of use; and
    perform, by the computing system, a domain-specific task in accordance with the intention of the user, by an executable generic task reasoning module and a run-time specification comprising a domain-specific plug-in task flow configured to the specific field of use.

* * * * *